US 8,719,926 B2

(12) United States Patent
Ormazabal et al.

(10) Patent No.: US 8,719,926 B2
(45) Date of Patent: May 6, 2014

(54) DENIAL OF SERVICE DETECTION AND PREVENTION USING DIALOG LEVEL FILTERING

(75) Inventors: Gaston S. Ormazabal, New York, NY (US); Henning G. Schulzrinne, Leonia, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 102 days.

(21) Appl. No.: 13/025,635

(22) Filed: Feb. 11, 2011

(65) Prior Publication Data
US 2012/0210007 A1 Aug. 16, 2012

(51) Int. Cl.
*G06F 11/00* (2006.01)

(52) U.S. Cl.
USPC ............. 726/22; 709/227; 726/11; 726/23; 370/356

(58) Field of Classification Search
CPC ............ H04L 65/1006; H04L 2463/141; H04L 63/1458; H04L 63/029
USPC ..................... 726/25, 22; 709/224
See application file for complete search history.

(56) References Cited

U.S. PATENT DOCUMENTS

| | | | | |
|---|---|---|---|---|
| 6,510,509 B1 * | 1/2003 | Chopra et al. | ................ | 712/13 |
| 6,772,334 B1 * | 8/2004 | Glawitsch | ................ | 713/153 |
| 7,002,973 B2 * | 2/2006 | MeLampy et al. | ............ | 370/401 |
| 7,028,092 B2 * | 4/2006 | MeLampy et al. | ............ | 709/230 |
| 7,133,923 B2 * | 11/2006 | MeLampy et al. | ............ | 709/231 |
| 7,349,994 B2 * | 3/2008 | Balonado et al. | ............ | 709/250 |
| 7,372,840 B2 * | 5/2008 | Le et al. | ................ | 370/338 |
| 7,380,010 B1 * | 5/2008 | Oran | ................ | 709/227 |
| 7,406,539 B2 * | 7/2008 | Baldonado et al. | ............ | 709/240 |
| 7,522,581 B2 * | 4/2009 | Acharya et al. | ............ | 370/352 |
| 7,620,053 B2 * | 11/2009 | MeLampy et al. | ........ | 370/395.31 |
| 7,681,038 B1 * | 3/2010 | Dawson et al. | ............ | 713/168 |
| 7,774,849 B2 * | 8/2010 | Russell et al. | ................ | 726/25 |
| 7,792,065 B2 * | 9/2010 | Jepson et al. | ............ | 370/261 |
| 7,848,231 B2 * | 12/2010 | Hayakawa et al. | ............ | 370/230 |
| 7,853,680 B2 * | 12/2010 | Phatak | ............ | 709/223 |
| 7,898,995 B2 * | 3/2011 | Shahidi et al. | ............ | 370/311 |
| 8,064,435 B2 * | 11/2011 | Shaikh et al. | ............ | 370/352 |
| 8,085,763 B2 * | 12/2011 | Niccolini et al. | ............ | 370/373 |
| 8,180,031 B2 * | 5/2012 | Tonegawa | ........ | 379/100.17 |
| 8,220,042 B2 * | 7/2012 | Hagiu et al. | ................ | 726/14 |
| 8,245,032 B2 * | 8/2012 | Donley et al. | ................ | 713/160 |
| 8,302,186 B2 * | 10/2012 | Ormazabal et al. | ............ | 726/22 |
| 8,306,016 B2 * | 11/2012 | Rosenberg et al. | ............ | 370/352 |

(Continued)

OTHER PUBLICATIONS

Abdelnur, Humberto et al., "Advanced Network Fingerprinting", Springer-Verlag, RAID 2008, LNCS 5230, pp. 372-389 Mar. 14, 2008.*

(Continued)

*Primary Examiner* — Kevin Bates
*Assistant Examiner* — Clarence D McCray

(57) ABSTRACT

A method may include receiving a session initiation protocol (SIP) request message and determining whether a dialog exists corresponding to the request message. The method may also include determining whether the dialog is in a first phase or a second phase when a dialog exists corresponding to the session control protocol message and querying a table indicating valid protocol requests for the determined phase to determine whether the received request message is valid. The method may include rejecting the request message when determined that the request message is not valid.

23 Claims, 16 Drawing Sheets

(56) References Cited

U.S. PATENT DOCUMENTS

| | | | |
|---|---|---|---|
| 8,447,855 B2* | 5/2013 | Chesla | 709/225 |
| 8,464,329 B2* | 6/2013 | Fogel | 726/11 |
| 8,543,665 B2* | 9/2013 | Ansari et al. | 709/218 |
| 8,582,567 B2* | 11/2013 | Kurapati et al. | 370/356 |
| 2002/0112073 A1* | 8/2002 | MeLampy et al. | 709/240 |
| 2002/0145975 A1* | 10/2002 | MeLampy et al. | 370/235 |
| 2003/0229720 A1* | 12/2003 | Kiremidjian et al. | 709/253 |
| 2004/0148425 A1* | 7/2004 | Haumont et al. | 709/236 |
| 2004/0230659 A1* | 11/2004 | Chase | 709/206 |
| 2005/0165894 A1* | 7/2005 | Rosenberg et al. | 709/205 |
| 2006/0155814 A1* | 7/2006 | Bennett et al. | 709/207 |
| 2006/0182118 A1* | 8/2006 | Lam et al. | 370/395.42 |
| 2007/0121596 A1* | 5/2007 | Kurapati et al. | 370/356 |
| 2007/0124813 A1* | 5/2007 | Ormazabal et al. | 726/11 |
| 2007/0151596 A1* | 7/2007 | Nasuno et al. | 136/256 |
| 2008/0127349 A1* | 5/2008 | Ormazabal et al. | 726/25 |
| 2008/0209522 A1* | 8/2008 | Ephraim et al. | 726/4 |
| 2008/0222721 A1* | 9/2008 | Kinoshita | 726/21 |
| 2008/0222724 A1* | 9/2008 | Ormazabal et al. | 726/23 |
| 2009/0006841 A1* | 1/2009 | Ormazabal et al. | 713/152 |
| 2009/0070469 A1* | 3/2009 | Roach et al. | 709/226 |
| 2009/0193128 A1* | 7/2009 | Motohashi et al. | 709/228 |
| 2009/0293123 A1* | 11/2009 | Jackson et al. | 726/23 |
| 2009/0310484 A1* | 12/2009 | Sisalem et al. | 370/230 |
| 2010/0064172 A1* | 3/2010 | George et al. | 714/15 |
| 2010/0154057 A1* | 6/2010 | Ko et al. | 726/23 |
| 2010/0284282 A1* | 11/2010 | Golic | 370/242 |
| 2010/0312901 A1* | 12/2010 | Noyranen et al. | 709/228 |
| 2011/0099282 A1* | 4/2011 | Avila et al. | 709/229 |
| 2011/0161508 A1* | 6/2011 | Kim et al. | 709/228 |
| 2011/0225307 A1* | 9/2011 | George et al. | 709/227 |
| 2012/0117230 A1* | 5/2012 | McColGan et al. | 709/224 |

OTHER PUBLICATIONS

Ormazabal, Gaston; Nagpal, Sarvesh; Yarden, Eilon; and Schulzrinne, Henning. "Secure SIP: A Scalable Prevention Mechanism for DoS attacks on SIP Based VoIP Systems." Springer-Verlag, IPTComm 2008, LNCS 5310, pp. 107-132 Published Jul. 7, 2008.*

Humberto J. Abdelnur, et al., "Advanced Network Fingerprinting," Centre de Recherche INRIA Nancy—Grand Est, Villers-les-Nancy, France. Recent Advances in Intrusion Detection (RAID) 2008, pp. 372-389, 18 pages.

Gaston Ormazabal, et al., "Secure SIP: A Scalable Prevention Mechanism for DoS Attacks on SIP Based VoIP Systems," Verizon Laboratories, Department of Computer Science, Columbia University, Springer-Verlad, Berlin Heidelberg. IPTComm 2008, 26 pages.

Humberto J. Abdelnur, et al., version 1, "Advanced Network Fingerprinting," Centre de Recherche INRIA Nancy—Grand Est, Villers-les-Nancy, France. Recent Advances in Intrusion Detection (RAID) 2008, 19 pages.

* cited by examiner

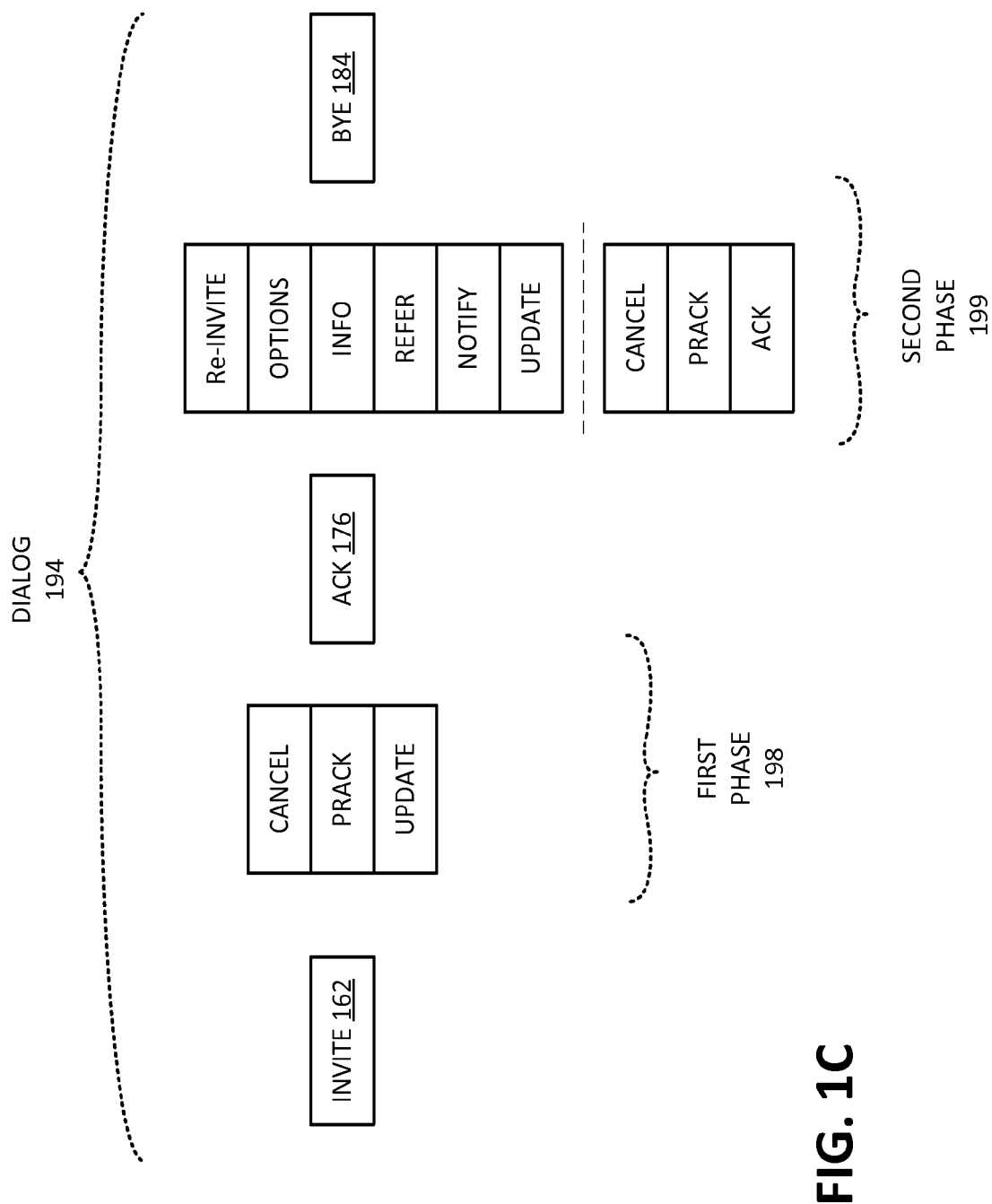

FIG. 3A

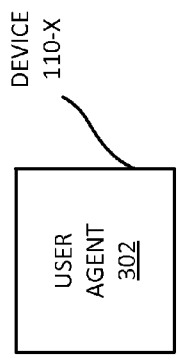

DEVICE 110-X
USER AGENT 302

FIG. 3B

```
INVITE sip:bob@biloxi.com SIP/2.0
Via: SIP/2.0/UDP pc33.atlanta.com;branch=z9hG4bK776asdhds
To: Bob sip:bob@biloxi.com
From: Alice <sip:alice@atlanta.com>;tag=1928301774
Call-ID: a84b4c76e66710@pc33.atlanta.com
CSeq: 314159 INVITE
 * * *
```

HEADER 310

FIG. 3C

```
SIP/2.0 200 OK
Via: SIP/2.0/UDP server10.biloxi.com;
     branch=z9hG4bKnashds8; received=192.0.2.3
Via: SIP/2.0/UDP bigbox3.site3.atlanta.com;
     branch=z9hG4bK77ef4c2312983.1; received=192.0.2.1
Via: SIP/2.0/UDP pc33.atlanta.com;
     branch=z9hG4bK776asdhds; received=192.0.2.1
To: Bob <sip:bob@biloxi.com>;tag=a6c85cf
From: Alice <sip:alice@atlanta.com>;tag=1928301774
Call-ID: a84b4c76e66710@pc33.atlanta.com
CSeq: 314159 INVITE
 * * *
```

HEADER 312

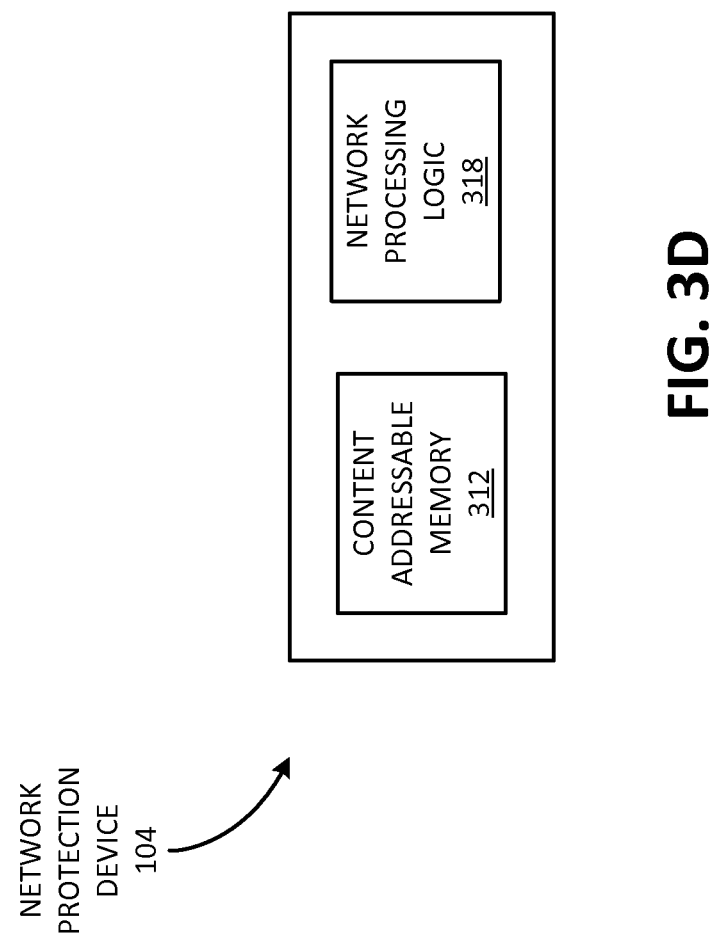

FIG. 4A

DIALOG TABLE 412

| CALL-ID 414 | FROM TAG 416 | TO TAG 418 | PHASE 420 |
|---|---|---|---|
| a89eu@florida.com | df36hf | 9834 | 2 |
| ... | ... | ... | ... |

DIALOG TABLE 412'

| CALL-ID 414 | FROM TAG 416 | TO TAG 418 | PHASE 420 |
|---|---|---|---|
| a84b4c76e66710@pc33.atlanta.com | 1928301774 | | 1 |
| a89eu@florida.com | df36hf | 9834 | 2 |
| ... | ... | ... | ... |

DIALOG TABLE 412"

| CALL-ID 414 | FROM TAG 416 | TO TAG 418 | PHASE 420 |
|---|---|---|---|
| a84b4c76e66710@pc33.atlanta.com | 1928301774 | a6c85cf | 2 |
| a89eu@florida.com | df36hf | d98jl | 2 |
| ... | ... | ... | ... |

432-3
432-1

PHASE-TWO TABLE 454

| CALL-ID FIELD 424 | FROM TAG 426 | TO TAG 428 | VALID REQUEST 422 |
|---|---|---|---|
| a84b4c76e66710@pc33.atlanta.com | 1928301774 | a6c85cf | INVITE |
| a84b4c76e66710@pc33.atlanta.com | 1928301774 | a6c85cf | OPTIONS |
| a84b4c76e66710@pc33.atlanta.com | 1928301774 | a6c85cf | INFO |
| a84b4c76e66710@pc33.atlanta.com | 1928301774 | a6c85cf | REFER |
| a84b4c76e66710@pc33.atlanta.com | 1928301774 | a6c85cf | NOTIFY |
| a84b4c76e66710@pc33.atlanta.com | 1928301774 | a6c85cf | UPDATE |
| a84b4c76e66710@pc33.atlanta.com | 1928301774 | a6c85cf | BYE |
| a84b4c76e66710@pc33.atlanta.com | 1928301774 | a6c85cf | CANCEL |
| a84b4c76e66710@pc33.atlanta.com | 1928301774 | a6c85cf | PRACK |
| a84b4c76e66710@pc33.atlanta.com | 1928301774 | a6c85cf | ACK |
| ... | ... | ... | ... |

DENIAL OF SERVICE DETECTION AND PREVENTION USING DIALOG LEVEL FILTERING

BACKGROUND INFORMATION

A communication network may employ a "session signaling" or "session control" protocol to create, modify, and terminate sessions (e.g., telephone calls, instant messaging conferences) among participants of the session. Session Initiation Protocol (SIP) is one such session signaling protocol, e.g., an application-layer protocol for creating, modifying, and terminating sessions.

It is not uncommon for malicious devices in a communication network to attempt to compromise the network, thereby preventing legitimate devices from enjoying the services of the network. Such an attack is called a "denial-of-service" (DoS) attack. When multiple devices, e.g., a botnet, launch a DoS attack, it is known as a Distributed DoS (DDos) attack. Malicious devices may target the network devices that employ the session signaling or session control protocols for creating, modifying, and terminating sessions.

BRIEF DESCRIPTION OF THE DRAWINGS

FIG. 1C is a diagram of exemplary requests allowed during different phases of a dialog;

FIG. 3A is a block diagram of exemplary components of the devices of FIGS. 1A and 1D;

FIG. 3B is a diagram of an exemplary Session Initiation Protocol (SIP) header in an INVITE request message;

FIG. 3C is a diagram of an exemplary SIP header in an OK message;

FIG. 3D is a block diagram of exemplary components of the network protection device of FIG. 1D;

FIGS. 4A through 4C are diagrams of an exemplary table stored in the network protection device of FIG. 1D for identifying existing dialogs;

FIG. 4E is a diagram of an exemplary phase-two table stored in the network protection device of FIG. 1D for identifying valid requests during the second phase of a dialog;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention, as claimed.

As discussed above, a communication network may employ a session control protocol to establish and terminate sessions between devices. In doing so, the network may employ a proxy to handle session signaling on behalf of a user device. The proxy may handle session signaling for many (e.g., thousands or millions) of devices. Therefore, overwhelming a proxy may deny service to thousands or millions of customers. Embodiments disclosed herein may detect session requests that have invalid dialog identifiers and may detect requests that occur in the wrong phase of a dialog between devices 110. These embodiments may implement hardware-based deep packet inspection (DPI) technology (e.g., inspection at the application or seventh layer of the Opsen System interconnection (OSI) model stack). These embodiments may further help thwart DoS and DDoS attacks. Embodiments disclosed below may allow for the detection of and prevention of DDoS attacks on the Session Initiation Protocol (SIP) signaling channel.

Many network providers are migrating to communication networks that employ session control protocols (e.g., SIP) and proxies. These networks include: (1) an all Internet Protocol (IP) network using SIP proxies; (2) an IP Multimedia Subsystem (IMS) network using a SIP proxies; and (3) a Long Term Evolution (LTE) network with Voice over LTE using a SIP proxy. These and other networks are vulnerable to DoS and DDoS attacks. In these networks, protecting the proxy from a DoS attack may prove useful.

Figure 1A:
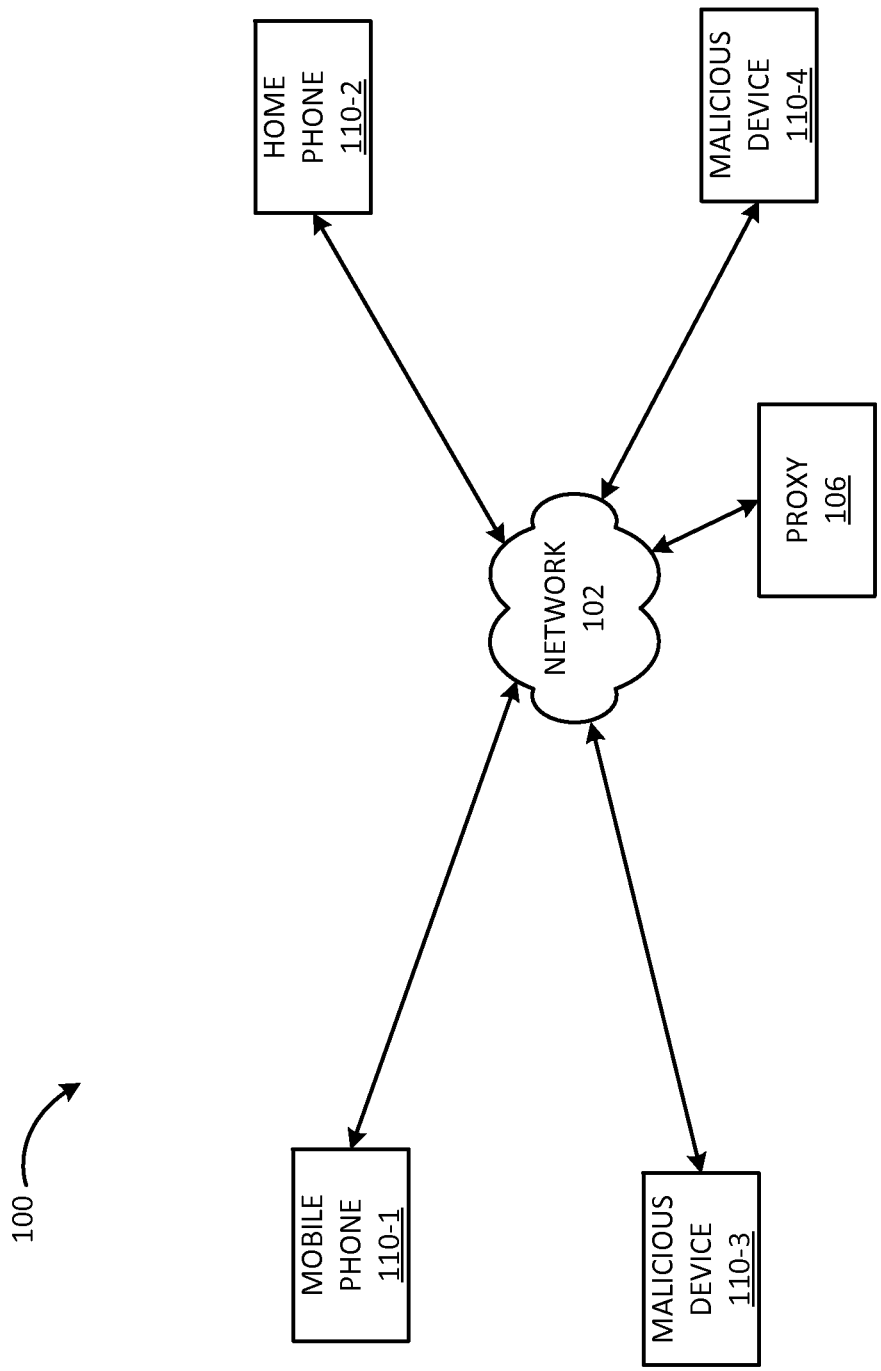
FIG. 1A is a block diagram of exemplary components of a network for implementing embodiments disclosed herein.

FIG. 1A is a block diagram of exemplary components of a network 100 for implementing embodiments disclosed herein. Network 100 includes a proxy 106 and numerous devices 110 (individually, "device 110-x") coupled to a network 102. Devices 110 may include, for example, a mobile phone 110-1 and a home phone 110-2. Devices 110 may also include malicious devices 110-3 and 110-4.

In network 100, for example, the user of mobile phone 110-1 may wish to call home phone 110-2. The call, or session, may be established using proxy 106 and a session control protocol, such as SIP. Malicious devices 110-3 and/or 110-4, however, may try to disrupt network 100 (e.g., by attacking proxy 106) in a way that would prevent the call from mobile phone 110-1 to home phone 110-2 from going through. As described above, one type of attack that a malicious devices 110-3 and 110-4 may use is a DoS attack or a DDoS attack directed proxy 106.

Network 102 may include a wired or wireless network. Network 102 may include a wireless public land mobile network (PLMN) (e.g., a cellular network). The PLMN may include a Code Division Multiple Access (CDMA) 2000 PLMN, a Global System for Mobile Communications (GSM) PLMN, a Long Term Evolution (LTE) PLMN and/or other type of PLMN. In addition to a wireless network, network 220 may include one or more other networks of various types, such as, for example, a telecommunications network (e.g., a Public Switched Telephone Network (PSTN)), a local area network (LAN), a wide area network (WAN), a metropolitan area network (MAN), an intranet, the Internet, and/or a cable network (e.g., an optical cable network). Network 102 may include a wireless satellite network.

Devices 110 may include mobile telephones, personal digital assistants (PDAs), laptop computers, desktop computers, tablet computers, or another type of computation or communication device. Devices 110 may connect to network 102 via wired, wireless, and/or optical connections. Devices 110 may include user agents (UAs) that implement SIP according to the Internet Engineering Task Force (IETF) document RFC 2543 and document RFC 3261.

Proxy 106 may include a device that facilitates the establishment, definition, and termination of sessions, such as telephone calls, on behalf of devices (e.g., devices 110). Proxy 106 may implement SIP according to the IETF document RFC 2543 and document RFC 3261. Proxy 106 may route requests to a user's location, authenticate and authorize users for services provided by proxy 106, implement call-routing policies, and provide other features to users.

SIP is a request/response protocol used for signaling in, for example, voice over IP networks. In SIP, the peer-to-peer relationship between two devices 110 is known as a "dialog." The dialog provides the context to facilitate exchange of messages between devices 110. Messages exchanged between devices 110 can be, for example, either a request or its associated responses. A request and its responses may be referred to as a "transaction." A dialog may include one or more transactions. Various requests are defined in SIP to provide different functionality. For example, an INVITE request is used to initiate a call and a BYE requests is used to end the call.

Figure 1B:
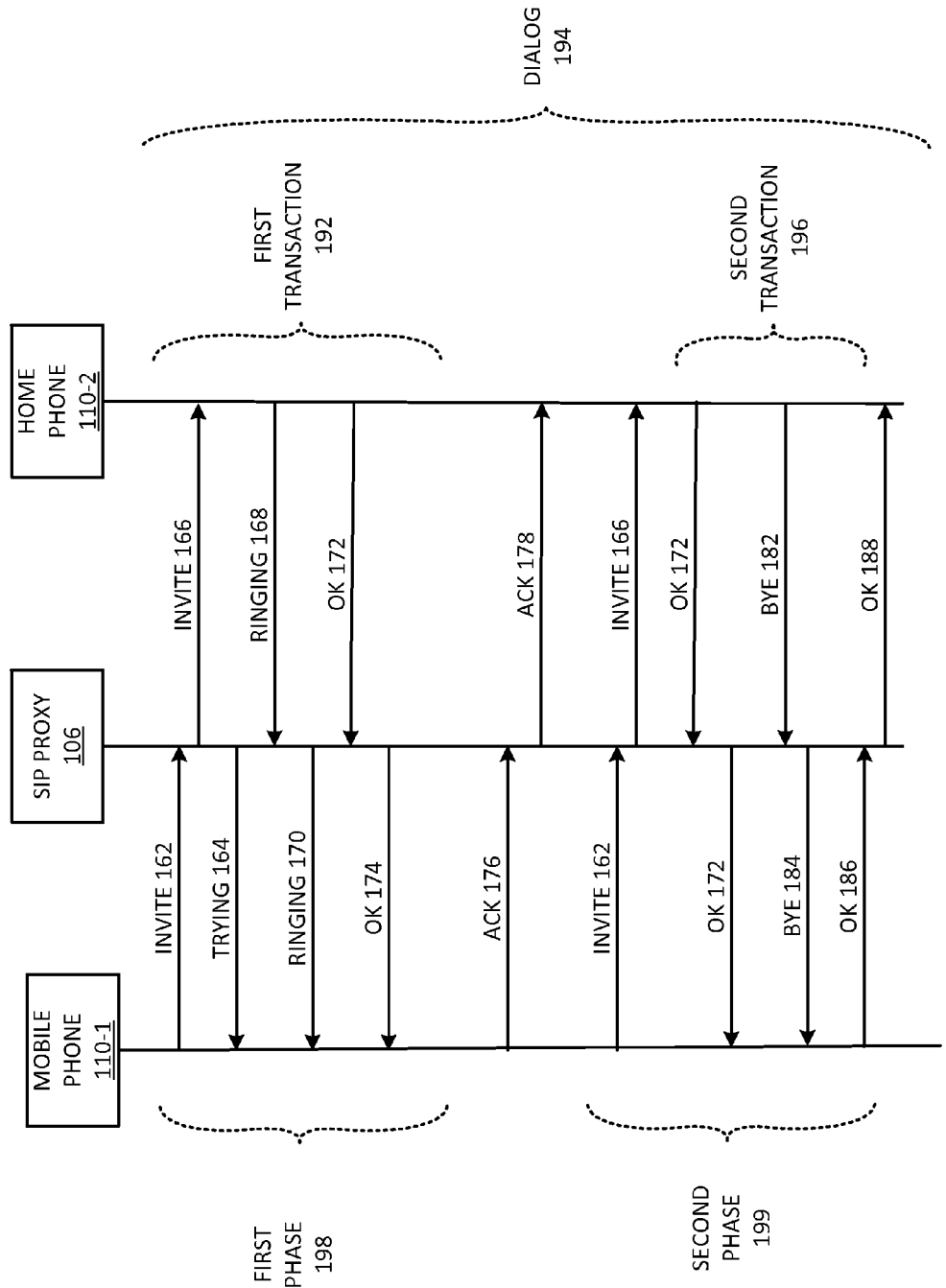
FIG. 1B is a signal diagram of exemplary messages sent between devices in the network of FIG. 1A.

FIG. 1B is a signal diagram of an exemplary dialog including transactions between mobile phone 110-1 and home phone 110-2. As shown, mobile phone 110-1 sends an INVITE request 162 to home phone 110-2 through proxy 106. Proxy 106 intercepts INVITE request 162 and returns a TRYING message 164 to mobile phone 110-1. Proxy 106 also forwards an INVITE request 166 to home phone 110-2. Home phone 110-2 responds with a RINGING message 168 to proxy 106, which proxy 106 forwards as RINGING message 170 to mobile phone 110-1. As further shown in FIG. 1B, if a call is established, home phone 110-2 sends an OK message 172 to proxy 106, which proxy 106 forwards to mobile phone 110-1 as OK message 174. Mobile phone 110-1 sends an ACK message 176 to proxy 106, and proxy 106 sends an ACK message 178 to home phone 110-2. Messages 162 through 174 may be considered a transaction ("first transaction 192") of a dialog 194 between mobile phone 110-1 and home phone 110-2. In this example, a first phase 198 of dialog 194 includes the first transaction.

If home phone 110-2 wishes to terminate the session, home phone 110-2 sends a BYE message 182 to proxy 106, and proxy 106 sends a BYE message 184 to mobile phone 110-1. In response, mobile phone 110-1 sends an OK message 186 to proxy 106, and proxy 106 forwards an OK message 188 to home phone 110-2. Messages 182 through 188 form another transaction ("second transaction 196") in dialog 194 between mobile phone 110-1 and home phone 110-2. A second phase 199 of dialog 194 includes second transaction 196 and potentially other transactions (not shown).

FIG. 1C is a block diagram of different requests allowed during different phases of the dialog shown in FIG. 1B. A dialog (e.g., dialog 194) may be initiated with an INVITE request 162 and terminated with a BYE request 184. Dialog 194 may be divided into two phases, namely, a first phase 198 and a second phase 199. First phase 198 (or "establishing phase 198") is the phase in which ACK message 176 for the initial INVITE message 162 has yet to be received by proxy 106. On the other hand, second phase 199 (or "established phase 199") is characterized by the presence of ACK 176 for the initial INVITE 162. Second phase 199 may be terminated by BYE request 182, for example.

As indicated in FIG. 1C, the following requests may be allowed in phase one 198 between INVITE request 162 and ACK request 176: CANCEL, PRACK, and UPDATE. In phase two 199, the following requests between ACK request 176 and BYE 184 may be allowed: Re-INVITE, OPTIONS, INFO, REFER, NOTIFY, and UPDATE. While CANCEL, PRACK, and ACK requests may be allowed during the second phase, they are both sent subsequent to one of the other listed requests (e.g., as part of an ongoing transaction). The purpose of the requests (either in phase one or phase two) are discussed in more detail below. Embodiments disclosed herein may filter messages that are out-of-phase.

DoS attacks against SIP-based components (e.g., proxy 106), include three types of attacks: (1) attacks to exploit a protocol implementation flaw, (2) attacks to exploit application-layer vulnerabilities, and (3) attacks that flood a device with messages.

Implementation flaw attacks occur when a specific flaw in the implementation of a component (e.g., proxy 106) is exploited. For example, malicious device 110-4 may send a malicious packet to proxy 106 that causes unexpected behavior in proxy 106, resulting in proxy 106 being unable to service legitimate devices 110. The malicious packet may interact with the software or firmware in proxy 106 to cause the unexpected behavior. Unexpected behaviors include, for example, excessive memory use, excessive disk use, excessive processor use, a system reboot, or a system crash. The unexpected behavior may have resulted from inadequate testing of software running in proxy 106, improper maintenance of software running in proxy 106 (e.g., a bad software patch), etc. The vulnerability that causes the unexpected behavior may reside in various different levels of the network protocol stack, such as the TCP (Transmission Control Protocol) layer, the SIP layer, or in the underlying operating system.

Application-layer vulnerability attacks occur when a feature of the session control protocol (e.g., SIP) is manipulated to deny service to non-malicious users. In other words, a protocol manipulation attack occurs when an attacker sends a legitimate request that deviates from the intended purpose of the protocol in a way to overburden the proxy. These types of attacks include registration hijacking, call hijacking, and media modification.

Message flooding attacks occur when a large number of packets are sent to the component (e.g., proxy 106) in order to overwhelm the processing capacity of that component. In this case, the component is too busy to process all the non-attack, legitimate packets. Flooding attacks can occur from few sources (e.g., one or a limited number of sources) in the case of a DoS attack, or multiple sources (e.g., an unmanageably large number of distributed sources) in the case of a DDoS attack. In case of multiple sources, each attack from each source may individually go undetected, but the combined attack from the sources may overwhelm the component. A flooding attach may include signal flooding (e.g., SIP INVITE requests) or media flooding. In signal flooding, a large amount of SIP requests may be sent to a SIP element.

In a typical DoS attack the source of the attack is usually a single server or a small network of servers. Such attacks may be successfully handled by IP address blocking (e.g., of a finite number of sources) and/or statistical methods involving traffic modeling and rate-limiting techniques at the IP network layer. A more complex attack, and far more difficult to combat, is the DDoS attack. In this case, a network of perhaps millions of unwitting computers (e.g., a "botnet") is commandeered to carry out an attack. Network- and transport-layer (e.g., layers 3 and 4) solutions may fail in such DDoS attacks because it is difficult to create whitelists and blacklists based on network address for millions of devices. Likewise, the statistical and rate limiting techniques may fail by an attack in which a single malicious packet is generated per malicious source. In this case, each malicious source may not appear malicious, but the aggregate flood of packets from a million hosts to the same target would clearly cause a flooding attack.

Figure 1D:
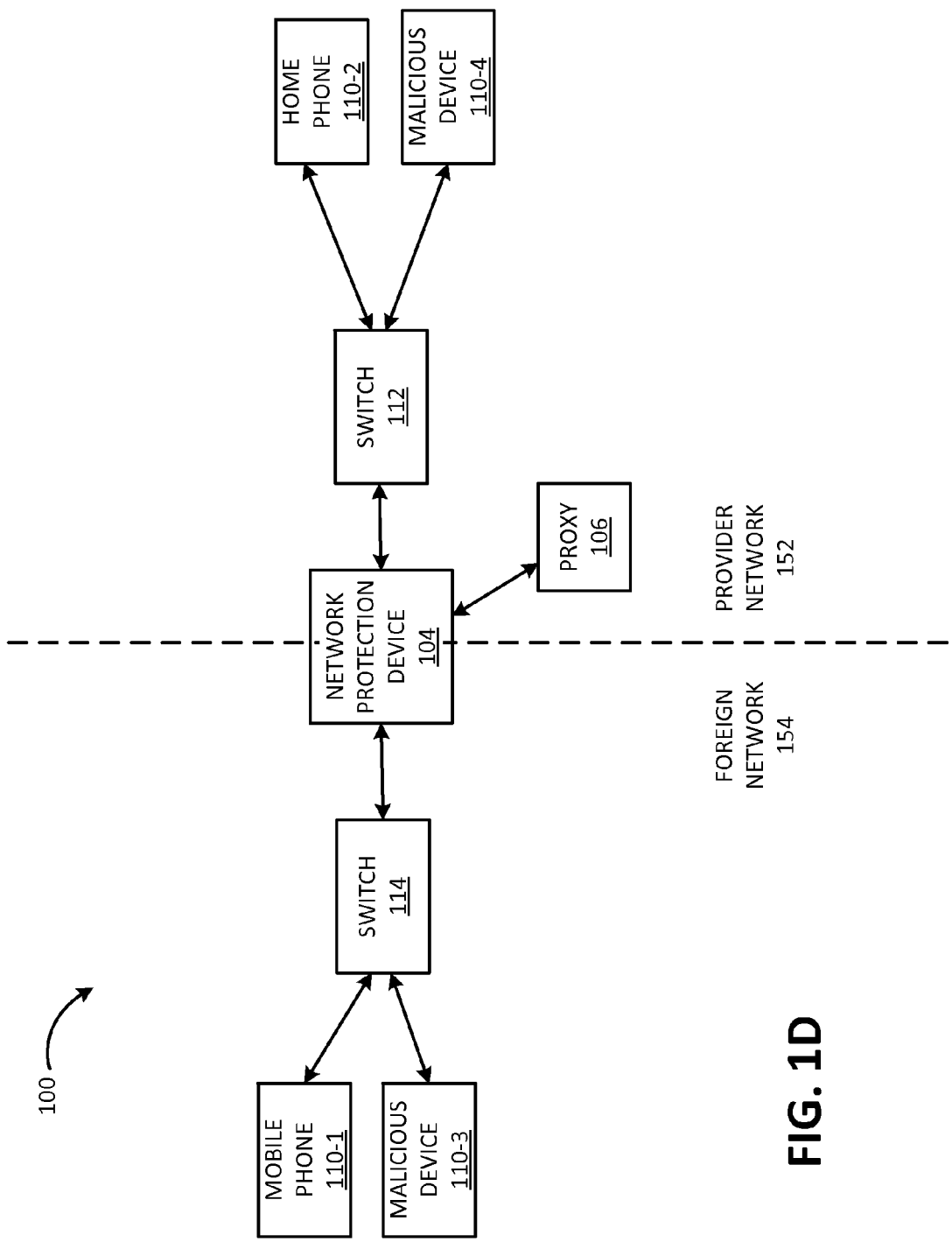
FIG. 1D is a block diagram of the network of FIG. 1A with more detail.

FIG. 1D is a block diagram of network 100 showing additional exemplary components. In addition to those components shown in FIG. 1A, FIG. 1D shows a network protection device 104 (NPD 104) and switches 112 and 114. FIG. 1D also shows network 100 divided into a provider network 152 and a foreign network 154.

In the embodiment shown, provider network 152 may provide devices 110 with communication services (e.g., using proxy 106). That is, the users of devices 110 in provider network 152 may subscribe to these services. Provider network 152 may deploy NPD 104 to protect provider network 152 from malicious devices in foreign network 154 (e.g., malicious device 110-3). In some embodiments, NPD 104 may also protect provider network 152 from malicious devices in provider network 152 (e.g., malicious device 110-4). In this embodiment, NPD 104 may protect proxy 106 against malicious network traffic, such as a DoS or DDoS attack. NPD 104 may be located to receive traffic from foreign network 154 (e.g., rather than proxy 106 receiving the traffic directly). NPD 104 may analyze and exert control over signaling messages intended for proxy 106. NPD 104 may also analyze and exert control over media streams intended for the media infrastructure (e.g., switch 112) in provider network 152. As shown in FIG. 1D, traffic directed towards proxy 106, from either foreign network 154 or provider network 152, may first go through NPD 104 before reaching proxy 106. NPD 104 may analyze traffic by performing deep-packet inspection (e.g., inspection at the application or seventh layer of the OSI model stack). Based on the analysis, the NPD 104 may determine whether to allow or reject packets (e.g., packets including session signaling or packets including media). NPD 104 is discussed in more detail below.

As described above, a DoS attack in network 100 may be directed at proxy 106. By overburdening the processors in proxy 106 with SIP requests, for example, malicious devices 110-3 and 110-4 may attempt to prevent other devices 110 from placing or receiving calls. With NPD 104, however, the process of examining each request for threats may be shifted in part from proxy 106 to NPD 104. In one embodiment, NPD 104 may include higher performance hardware than proxy 106 and may be better suited to handling a DoS attack. NPD 104, therefore, may decrease the processing load on proxy 106 so that proxy 106 may more adequately respond to legitimate traffic as opposed to DoS traffic. In one embodiment, proxy 106 determines whether to accept or reject (e.g., a Boolean determination) an incoming request. NPD 104 may also implement ultra-high speed deep-packet inspection, allowing network 100 to scale to handle real-world traffic volume. With ultra-high speed DPI technology, individual IP addresses may be marked as malicious, for example, even based on a single malicious packet, when application-layer information is obtained and processed for decision making at wireline speeds. Embodiments disclosed herein allow for the categorization of a request as malicious based on application-layer SIP information, such as information identifying the dialog. Embodiments disclosed herein allow for the capability to distinguish an attack from millions of IP addresses using this application-layer information to discriminate between legitimate and malicious traffic.

FIGS. 1A and 1D show exemplary components of network 100. In other implementations, network 100 may include fewer, additional, or a different arrangement of components. For example, network 100 may include additional proxies for receiving and forwarding session control messages. Network 100 may also include thousands or millions of devices 110.

Further, in other implementations, any components of network 100 may perform the tasks performed by one or more other component of network 100.

Figure 2:
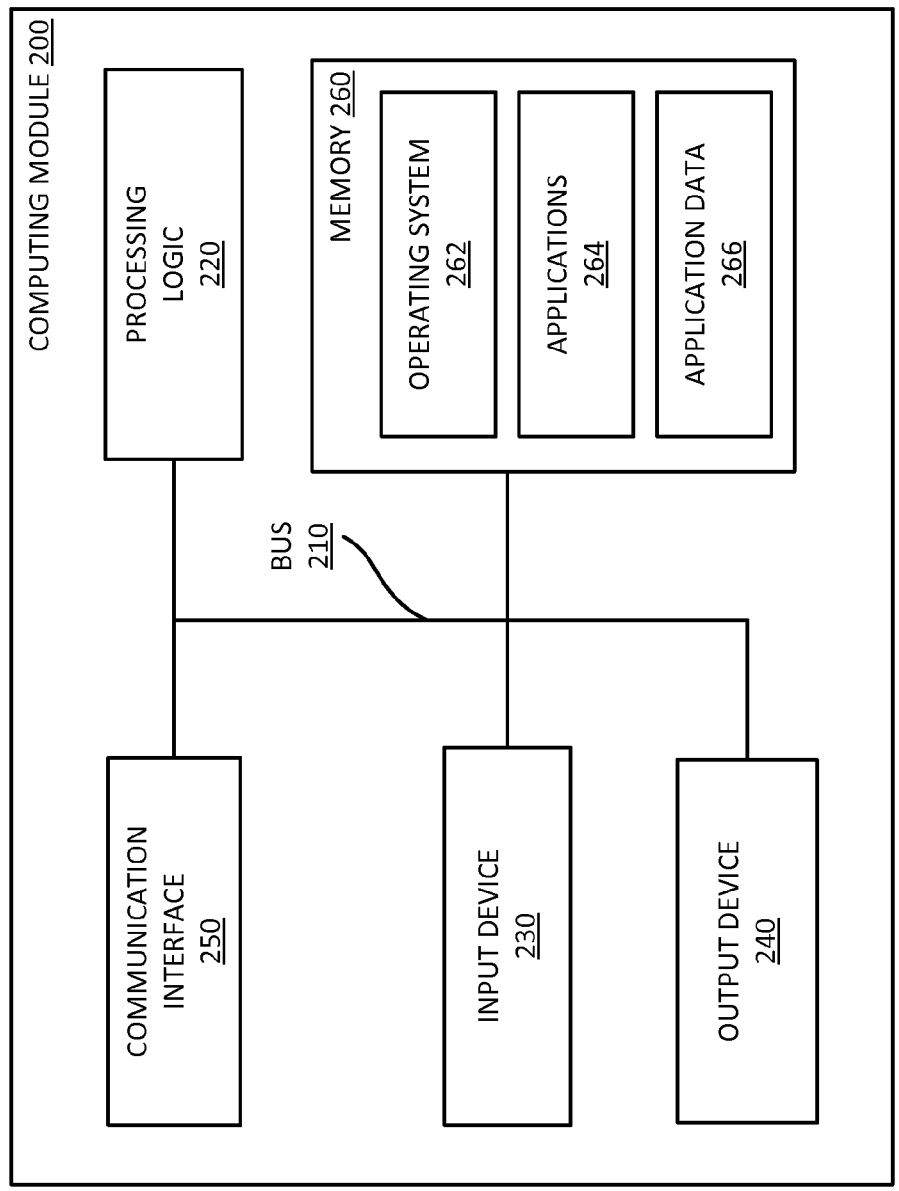
FIG. 2 is a block diagram of exemplary components of a computing module 200.

Devices in network 100 may each include one or more computing modules. FIG. 2 is a block diagram of exemplary components of a computing module 200. Computing module 200 may include a bus 210, processing logic 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 may include a path that permits communication among the components of computing module 200. Processing logic 220 may include any type of processor or microprocessor (or families of processors or microprocessors) that interprets and executes instructions. In other embodiments, processing logic 220 may include an application-specific integrated circuit (ASIC), a field-programmable gate array (FPGA), a multi-core processor, a reduced-instruction set code (RISC) processor, etc.

Input device 230 may allow a user to input information into computing module 200. Input device 230 may include a keyboard, a mouse, a pen, a microphone, a remote control (e.g., remote control 260), an audio capture device, an image and/or video capture device, a touch-screen display, etc. Some devices, such as home phone 110-2 may include a keypad for entering telephone numbers when calling a party. Mobile phone 110-1 may include a keypad or a touch screen for entering numbers for calling a party. On the other hand, network protection device 104, and SIP proxy 106 may be managed remotely and may not include input device 230. In other words, some devices may be "headless" and may not include a keyboard, for example.

Output device 240 may output information to the user. Output device 240 may include a display, a printer, a speaker, etc. For example, mobile phone 110-1 may include a liquid-crystal display (LCD) for displaying information to the user, such as the name and/or number of a calling party. Headless devices, such as SIP server 106, NPD 104, and switches 114 and 112 may be managed remotely and may not include output device 240.

Input device 230 and output device 240 may allow a user to activate and interact with a particular service or application, such as telephone application to call a party. Input device 230 and output device 240 may allow a user to receive and view a menu of options and select from the menu options. The menu may allow the user to select various functions or services associated with applications executed by computing module 200.

Communication interface 250 may include a transceiver that enables computing module 200 to communicate with other devices or systems. Communication interface 250 may include a transmitter that converts baseband signals to radio frequency (RF) signals or a receiver that converts RF signals to baseband signals. Communication interface 250 may be coupled to an antenna for transmitting and receiving RF signals. Communication interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth™ wireless interface, a radio-frequency identification (RFID) interface, a near-field communications (NFC) wireless interface, etc.

Memory 260 may store, among other things, information and instructions (e.g., applications 264 and operating system 262) and data (e.g., application data 266) for use by processing logic 220. Memory 260 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 262 may include software instructions for managing hardware and software resources of computing module 200. For example, operating system 262 may include Linux, Windows, OS X, OpenSolaris, Unix, etc. In the case of mobile phone 110-1, for example, operating system 262 may include MeeGo, Android, WebOS, iOS, Symbian, etc. Applications 264 and application data 266 may provide network services or include applications, depending on the device in which the particular computing module 200 is found.

Computing module 200 may perform the operations described herein in response to processing logic 220 executing software instructions contained in a computer-readable medium, such as memory 260. A computer-readable medium may include a physical or logical memory device. The software instructions may be read into memory 260 from another computer-readable medium or from another device via communication interface 250. The software instructions contained in memory 260 may cause processing logic 220 to perform processes that are described herein.

FIG. 3A is a block diagram of additional exemplary components of device 110-x. Devices 110 may each include a user agent 302. The components of device 110-x are shown for ease of understanding and simplicity. Device 110-x may include more, fewer, or a different arrangement of components.

User agent 302 may use a protocol (e.g., SIP) to establish, define, and terminate sessions with other devices. A session may include a lasting connection between two devices that may carry a stream of packets from one device to the other and/or vice versa. User agent 302 may perform the functions of a user agent client (UAC) and/or a user agent server (UAS). A UAC is a logical entity that creates a new request, and then uses client transaction state machinery to send it. The role of UAC may last for the duration of that transaction. In other words, if device 110-x initiates a request, user agent 302 acts as a UAC for the duration of that transaction. On the other hand, a UAS is a logical entity that generates a response to a SIP request. The response accepts, rejects, or redirects the request. The role of UAS may last for the duration of that transaction. In other words, if device 110-x responds to a request, user agent 302 acts as a UAS for the duration of that transaction.

When generating a SIP request, user agent 302 generates the request and the header for the request, such as the header to an INVITE message. FIG. 3B shows an exemplary SIP header 310 generated by user agent 302. Header 310 is the header for an INVITE message sent from Alice to Bob. Header 310 includes the following fields: a Via field, a To field, a From field, a Call-ID field, and a CSeq field. In addition to those fields, header 310 includes a request line or field (e.g., the first line of header 310), which includes the method (e.g., INVITE), a request-URI (e.g., bob@giloxi.com), and the SIP version (e.g. SIP/2.0). Header 310 is exemplary and may include additional or fewer fields. Further the information in header 310 is exemplary. The fields in header 310 are described in more detail below.

FIG. 3C shows an exemplary header 310 generated by user agent 302. Header 312 is the header for a 200 OK message sent from Bob to Alice. Header 312 includes the following fields: a Via field, a To field, a From field, a Call-ID field, and a CSeq field. In addition to those fields, header 312 includes a request line or field (e.g., the first line of header 312), which includes the method (e.g., 200 OK) and the SIP version (e.g. SIP/2.0). Header 312 is exemplary and may include additional or fewer fields. Further the information in header 312 is exemplary. The fields in header 312 are described in more detail below.

The Via field may include the address (e.g., pc33.atlanta.com) at which a user (e.g., Alice) is expecting to receive responses to the request. The Via field may also include a branch parameter that uniquely identifies this transaction.

The To field may include the desired or logical recipient of the request or the address-of-record of the user or resource that is the target of this request. For example, the To field may include a display name (e.g., Bob) and a SIP URI or SIPS URI (e.g., sip:bob@biloxi.com) to which the request is originally directed. If a dialog has already been established, the To field may include a To tag, which may identify the peer of the dialog. If the SIP request is outside a dialog, then the To field may not include a To tag.

The From field indicates the logical identity of the initiator of the request, possibly the user's address-of-record. For example, the From field may also include a display name (e.g., Alice) and a SIP URI or SIPS URI (e.g., sip:alice@atlanta.com) that indicate the originator of the request. The From field may also include a tag parameter that includes a string (e.g., a random string such as 1928301774) added to the URI by the originating user agent, for example. The string may be used for identification purposes.

The Call-ID field may acts as a globally unique identifier for a series of SIP messages, such as a series of SIP messages to establish a session. For example, the unique identifier for the session may be generated by the combination of a random string and the user agent's host name or IP address. The combination of the To tag, From tag, and Call-ID may completely define a peer-to-peer SIP relationship between originator (e.g., Alice) and target (e.g., Bob) and is referred to as a dialog.

The CSeq or Command Sequence field may serve as a way to identify and order transactions. For example, the CSeq field may include an integer and a method name. The integer may be incremented for each new request within a dialog and may include a traditional sequence number.

A SIP dialog may be identified by method vulnerability filter 400 by a combination of a Call-ID, a From tag, and a To tag. A SIP transaction may be identified by method vulnerability filter 400 from a Branch parameter of a Via field, and from a Method name, and/or a command sequence in a CSeq field, for example. These fields may be used to construct a dialog ID and a transaction ID that may, in turn, be used to maintain corresponding state information. Both the dialog ID and/or the transaction ID may also be used by embodiments to maintain the corresponding state or phase of a dialog between two user agents. The dialog ID and/or transaction ID may be of variable length. In order to generate a fixed length index in CAM 312 of NPD 104, a 32-bit cyclic redundancy check ("CRC" or "CRC-32") hash algorithm may be applied on a collection of the aforementioned fields to generate a unique hash that may be used as an index in the CAM tables for state keeping.

FIG. 3D is a block diagram of exemplary components of NPD 104. NPD 104 may include content-addressable memory (CAM) 312 and network processing logic 318. The components of NPD 104 are exemplary. NPD 104 may include additional, fewer, or a different arrangement of components. Further, any one component of NPD 104 may perform the functions described as being performed by one or more other components of NPD 104.

CAM 312 may be implemented in NPD 104 for its high-speed searching capabilities. CAM 312 may include a binary CAM, which stores information using a system of 0 s and 1 s. Alternatively, CAM 312 may include a ternary CAM (TCAM), which uses a system of 0 s, 1 s and *s (e.g., a do-not-care (DNC) state). Because of the DNC state, one input may match multiple entries in the TCAM. In case of multiple matches, TCAM may return the first match or indices of multiple matches. Entries present in TCAM may be compared in parallel and one match or an index of multiple matches may be returned by the TCAM. The lookup time for a CAM may be approximately 4-10 nanoseconds, for example.

Network processing logic 318 allows NPD 104 to extract and examine data from incoming SIP requests. Processing logic 318 may include an array of one or more central processing units capable of handling network related functions and performing deep packet inspection at carrier-class rates. In one embodiment, processing logic 318 extracts information to identify the dialog associated with a request. Network processing logic 318 may query tables stored in CAM 312 to determine if an ongoing dialog exists that corresponds to the received SIP request. Network processing logic 318 may also determine whether the received SIP request is out-of-phase, e.g., is not a request that should be received at that phase of a SIP dialog.

Network processing logic 318 may include the Intel IXP 2800, which is capable of forwarding packets at 10 Gb/s. The IXP 2800 includes sixteen programmable, multi-threaded micro-engines that may support 23.1 giga-operations per second. Network processing logic 318 may include the XLS processor from RMI. Network processing logic 318 may include the C-Port processor family from Freescale. The XLS processor and the C-Port processor family may achieve deep packet inspection at rates greater than 10 Gig. A customized FPGA solution (e.g., in conjunction with a multi-core architecture) may achieve deep-packet inspection at rates of greater than 10 Gig (e.g., 40 or 100 Gig). A combination of the above architectures may also be used.

Figure 3E:
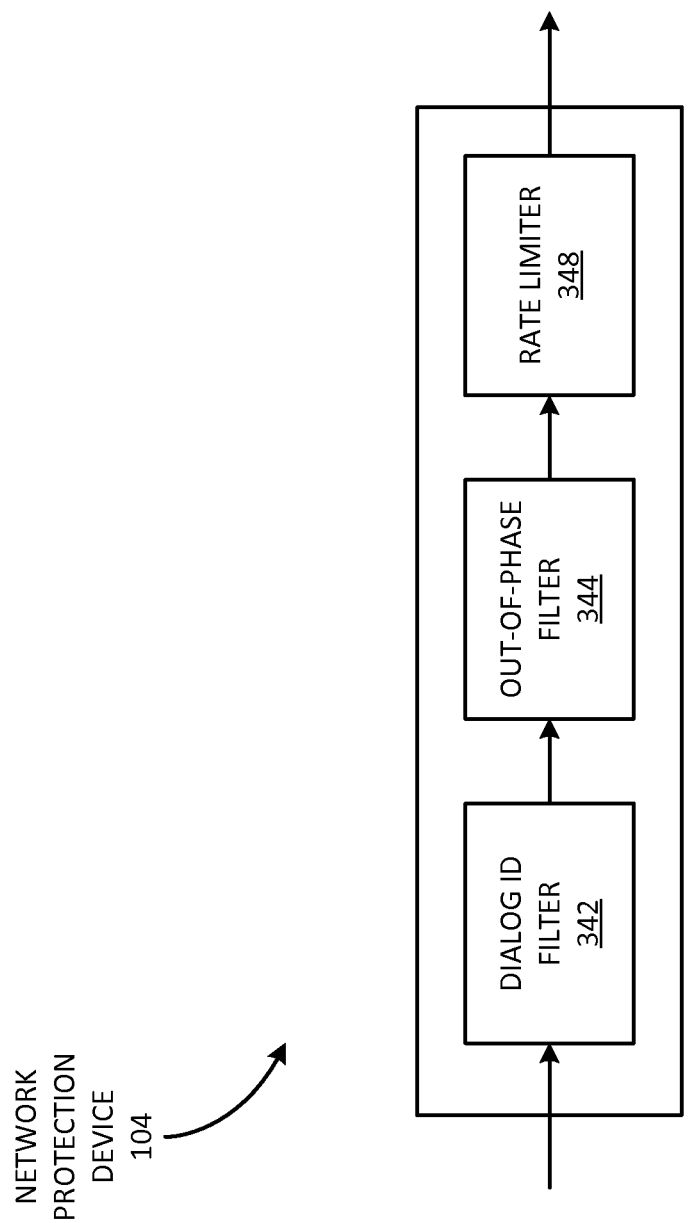
FIG. 3E is a block diagram of exemplary functional components of the network protection device of FIG. 1D.

FIG. 3E is a block diagram of exemplary functional components of NPD 104. NPD 104 may include a dialog ID filter 342, an out-of-phase filter 344, and a rate limiter 348. The components shown in FIG. 3E are exemplary. In other implementations, NPD 104 may include fewer, additional, or a different arrangement of components.

Dialog ID filter 342 may check incoming requests to determine whether the request includes an invalid dialog ID (e.g., a non-existing dialog ID). A dialog ID may be invalid if it does not belong to an ongoing dialog, for example, except when the dialog ID is associated with an INVITE request to start a dialog. Dialog ID filter 342 may extract the dialog ID (e.g., the Call-ID, the From tag, and/or the To tag) from the incoming SIP header, maintain a log of valid dialog IDs, and compare the extracted dialog ID with a list of valid dialog IDs. In one embodiment, dialog ID filter 342 may implement DPI technology to extract the dialog ID. This technology may inspect packet information present at the application layer. Dialog ID filter 342 may also employ CAM 312 to maintain a list of valid dialog IDs. In one embodiment, dialog ID filter 342 may implement a regular expression engine to efficiently extract the dialog ID information and implement pattern matching in order to compare dialog IDs and to determine validity.

Out-of-phase filter 344 may filter request messages that occur during the wrong phase of a dialog. Out-of-phase filter 344 may thwart out-of-phase attacks, which include the sending of requests which are not expected in the current phase of a dialog. While proxy 106 may maintain the state of a dialog between the parties, there is no defined protocol for the state machine of proxy 106 at the dialog level. Rather, each implementation of proxy 106 may define its own state machine in order to prevent race conditions and resolve conflicting requests.

In one embodiment, NPD 104 permits only certain requests within the two phases. For example, NPD 104 may allow the following requests in phase one 198 between INVITE request 162 and ACK request 176: CANCEL, PRACK, and UPDATE. In phase two 199, NPD 104 may allow the following requests between ACK request 176 and BYE 184: Re-INVITE, OPTIONS, INFO, REFER, NOTIFY, UPDATE, CANCEL, ACK, and PRACK. NPD 104 may filter messages that are out-of-phase. For example, out-of-phase filter 244 may filter a NOTIFY request while the dialog is currently in phase one. In one embodiment, out-of-phase filter 244 may filter CANCEL, PRACK, and ACK messages if they are not part of an ongoing transaction.

Rate limiter 348 may control the rate at which proxy 106 receives requests. As a result of dialog ID filter 342 and out-of-phase filter 344, rate limiter 348 receives requests with valid dialog IDs that arrive during the proper phase (e.g., phase one or two). Rate limiter 348 may reject some of these requests when the number of the same type of request, for example, exceeds a threshold. As discussed above, one DoS technique may launch a flood of requests by a legitimate user. Such attacks can be mitigated by rate limiter 348 by limiting each request type to a threshold number (e.g., one, two, five, etc.) of requests per second, for example. This threshold number of identical requests allowed may be based on factors such as network latency and topology.

FIG. 4A through 4C are diagrams of an exemplary dialog tables 412, 412', and 412" (collectively, "dialog tables 412") stored in the network protection device of FIG. 1D. Dialog table 412 may be stored in CAM 312, for example. Dialog table 412 may be used to identify ongoing dialogs between devices 110 that pass through proxy 106, for example. Entries may be added to dialog table 412 as dialogs are established during the session initiation process. Entries may be removed from dialog table 412 as dialogs are ended during the session termination process. Dialog tables 412, 412', and 412" are dialog tables at different times, for example. Network processing logic 318 may add and remove entries in dialog table 412 in the processes described below. As shown in FIGS. 4A through 4C, dialog table 412 may include a call-ID field 414, a From tag field 416, a To tag field 418, and a phase field 420.

Call-ID field 414, From tag field 416, and To tag field may identify a dialog between two user agents (e.g., UA 302 in two devices 110). As described above, the Call-ID and the From tag may be selected by the user agent that initiates a session. The To tag may be selected by the user agent invited to a session. The Call-ID, From tag, and To tag identify (e.g., uniquely) the dialog between the user agents. The Call-ID and From tag alone may also identify (e.g., uniquely) the dialog between the user agents. Further, the Call-ID alone may also identify (e.g., uniquely) the dialog between two user agents.

Call-ID field 414 may store the Call-ID information of a SIP request message header of an ongoing SIP dialog. As shown in FIG. 4A, an entry 432-1 includes a Call-ID field 414 of a89eu@florida.com. As shown in FIG. 4B, an entry 432-2 includes a Call-ID field 414 of a84b4c76e66710 @pc33.atlanta.com, which corresponds to the Call-ID field in header 310 shown in FIG. 3B.

From tag field 416 includes the From tag information of a SIP request message header of an ongoing SIP dialog. As shown in FIG. 4B, entry 432-2 includes a From tag of 1928301774, which corresponds to the From tag in header 310 shown in FIG. 3B.

To tag field 418 includes the To tag information of a SIP request message header of an ongoing SIP dialog. As shown in FIG. 4B, entry 432-2 does not include information in To tag field because such information may not yet have been determined or selected for the dialog. In this case, the dialog may be considered in the "early dialog" phase. On the other hand, To tag field 418 in entry 432-3 in dialog table 412" includes a To tag of a6c85cf, which corresponds to the To tag in header 312 shown in FIG. 3C. In this case, the To tag was selected by one user agent, transmitted to another user agent, and recorded in dialog table 412".

For ease of understanding, the dialog ID field in FIGS. 4A-4C are shown as based on the Call-ID (e.g., field 414), From tag (e.g., field 416), and To tag (e.g., field 418) from a corresponding message. The Call-ID and the From tag may be selected by the user agent that initiates a session. The To tag may be selected by the user agent invited to a session. The Call-ID, From tag, and To tag identify (e.g., uniquely) the dialog between the user agents. The Call-ID and From tag alone may also identify (e.g., uniquely) the dialog between the user agents. Further, the Call-ID alone may also identify (e.g., uniquely) the dialog between two user agents. In one embodiment, a hash function (e.g., a 32-bit CRC) may be applied to the information that identifies the dialog (e.g., the Call-ID, the From tag, and the To tag) to create a uniform length value for indexing CAM 312. In one embodiment, the dialog ID field 1404 may be based on the Call-ID, the source network address, and/or the destination IP address. In this embodiment, a hash function (e.g., CRC) may be applied to these values to create a uniform length value for indexing CAM 312.

Phase field 420 includes information indicating whether the corresponding dialog is in phase one or phase two. If a dialog is in its first phase, then phase field 420 indicates a "1." If a dialog is in its second phase, then phase field 420 indicates a "2."

The fields in dialog table 412 are exemplary and for ease of understanding. Dialog table 412 may include additional, fewer, or a different arrangement of fields. As discussed above, for example, the hash of fields 414-418 may replace fields 414-418 to identify a dialog (or the hash of other information may be used). As another example, dialog table 412 may also store information to identify the transaction ID associated with a dialog (e.g., with the INVITE request message used to start the dialog).

Figure 4D:
FIG. 4D is a diagram of an exemplary table stored in the network protection device of FIG. 1D for identifying valid requests during the first phase of a dialog.

FIG. 4D is a diagram of an exemplary phase-one table 452 and FIG. 4E is a diagram of an exemplary phase-two table 454. Phase-one table 452 lists the valid requests during the first phase of a dialog and phase-two table 454 lists the valid requests during the second phase of a dialog. As shown in FIG. 4D, for example, the allowed requests during the first phase of the dialog indicated in fields 424 through 428 includes a CANCEL request, a PRACK request, an UPDATE request, and an ACK request. Phase-one table 452 and phase-two table 454 may be stored in CAM 312, for example. Tables 452 and 454 each include a Call-ID field 414, a From tag field 416, a To tag field 418, and a valid request field 422.

Call-ID field 424, like call ID field 414 discussed above, may store the Call-ID information of a SIP request message header of an ongoing SIP dialog. As shown in FIG. 4D, an entry 460-1 includes a Call-ID field 414 of a84b4c76e66710 @pc33.atlanta.com, which corresponds to the Call-ID field in header 310 shown in FIG. 3B.

From tag field 426, like From tag field 426 discussed above, includes the From tag information of a SIP request message header of an ongoing SIP dialog. As shown in FIG. 4D, record 460-1 includes a From tag of 1928301774, which corresponds to the From tag in header 310 shown in FIG. 3B.

To tag field 426, like To tag field 418, includes To tag information of a SIP request message header of an ongoing SIP dialog. As shown in FIG. 4D, entry 432-2 does not include information in To tag field because such information may not yet have been determined or selected for the dialog. On the other hand, as shown in FIG. 4E, To tag field 428 in entry 470-1 in phase-two 454 includes a To tag of a6c85cf, which corresponds to the To tag in header 312 shown in FIG. 3C.

In this embodiment, the dialog ID field is based on the Call-ID (e.g., field 414), From tag (e.g., field 416), and To tag (e.g., field 418) from a corresponding message. The Call-ID, From tag, and To tag identify (e.g., uniquely) the dialog between the user agents. The Call-ID and From tag alone may also identify (e.g., uniquely) the dialog between the user agents. Further, the Call-ID alone may also identify (e.g., uniquely) the dialog between two user agents. In one embodiment, a hash function (e.g., a 32-bit CRC) may be applied to the information that identifies the dialog (e.g., the Call-ID, the From tag, and the To tag) to create a uniform length value for indexing CAM 312. In one embodiment, the dialog ID field 1404 may be based on the Call-ID, the source network address, and/or the destination IP address. In this embodiment, a hash function (e.g., CRC) may be applied to these values to create a uniform length value for indexing CAM 312.

Valid request field 422 identifies a request type that is valid at during the corresponding phase (e.g., during phase one in phase-one table 452 or during phase two in phase-two table 454). As shown in phase-one table 452, valid requests during phase one include CANCEL, PRACK, and UPDATE. ACK requests (e.g., entry 460-4) are included in phase-one table 452 for implementation purposes, even though ACK may not be considered part of phase one, but delineates between phases. As shown in phase-two table 454, valid requests during phase two include INVITE, OPTIONS, INFO, REFER, NOTIFY, UPDATE, BYE, CANCEL, PRACK, and ACK.

The fields and information stored in phase-one table 452 and phase-two table are exemplary. Tables 452 and 454 may include more, fewer, different fields. For example, phase-two table 452 may include information to identify a corresponding transaction ID (e.g. the hash of information that identifies a transaction ID). Such a field may permit NPD 104 to determine whether a CANCEL, PRACK, and/or ACK are part of an ongoing transaction. In this embodiment, when NPD 104 detects a new transaction, it may populate phase-two table 454 with an entry, for each transaction ID, for CANCEL, PRACK, and ACK, for example. Such a field may also allow NPD 104 to reject all PRACK messages not in response to an outstanding INVITE message. As another example, the hash of fields 424-428 may replace fields 424-428 to identify a dialog (or the hash of other information may be used).

As discussed above, a dialog may be initiated by sending an INVITE request by the caller (e.g., mobile device 110-1) to the callee (home phone 110-2). In this case, the SIP header includes the Call-ID, which may form part of the dialog ID. The initial INVITE request, however, does not contain a To tag since at that time a full dialog has not yet been established and no peer exists. This situation may be considered an "early dialog." Any request sent within the scope of the dialog associated with the initial INVITE request includes the same Call-ID.

The SIP protocol allows re-INVITE requests to be issued to modify an existing session. The modification can involve changing addresses or ports, adding or deleting a media stream, etc. The modification is carried out by issuing a new INVITE request within the same dialog that established the session. This session modifying INVITE, known as the re-INVITE request, includes the same Call-ID as the initial INVITE. The re-INVITE occurs only once a dialog is established, e.g., after an ACK request. The sender of the re-INVITE may or may not include a new session description. In the latter case the first reliable non-failure response to the re-INVITE may contain the new session description. Hence, the re-INVITE may differ from the initial INVITE by including a new session description, or it may not include any session description.

The ACK request is sent by the caller (e.g., mobile phone 110-1), for example, to acknowledge the final response sent by the callee (e.g., home phone 110-2). In FIG. 1B, ACK 176 is sent to acknowledge the OK 174 final response sent by home phone 110-2. From a dialog-level perspective, the ACK, which follows the INVITE contains the same Call-ID as the original INVITE.

Both the caller (e.g., mobile phone 110-1) and the callee (e.g., home phone 110-2) may use the BYE request in order to terminate an existing session. A legitimate BYE request will have the Call-ID of the existing dialog and will occur only once a dialog is established. The SIP protocol defines that the receiver of the BYE request should check if it matches an existing dialog. If the BYE does not match an existing dialog then the receiver should generate a 481 (Call/Transaction Does Not Exist) response.

The CANCEL request may be sent to cancel any pending requests. This request is useful for canceling requests that take too long to generate a response. Since all method requests other than INVITE are responded to immediately, CANCEL should be sent to cancel only INVITE requests. A race condition may be created whenever a CANCEL is used to cancel requests other than INVITE. A legitimate CANCEL request will have the same Call-ID (and dialog ID) as the initial INVITE.

The SIP method OPTIONS allows a user agent to query another user agent or a proxy server as to its capabilities. This request allows a user agent to discover information about the supported methods, content types, extensions, codecs, etc., without "ringing" the other party. For example, before a caller inserts a Require header field into an INVITE listing an option that it is not certain the destination callee supports, the caller can query the destination callee with an OPTIONS to see if this option is returned in a Supported header field. All SIP user agents must support the OPTIONS method.

The OPTIONS request can exist within or outside an existing dialog. An OPTIONS request received within a dialog generates a 200 OK response that is identical to one constructed outside a dialog and does not have any impact on the dialog. An OPTIONS request within a dialog may contain the Call-ID of the current dialog whereas an OPTIONS request outside of a dialog will have its own unique Call-ID.

The INFO request carries application-layer information along the SIP signaling path. The INFO request is not used to change the state of SIP calls, or the parameters of the sessions SIP initiates. The INFO request sends optional application-layer information, generally related to the session. The INFO request occurs within a dialog and hence needs a legitimate Call-ID in its SIP header. Following are the example uses of this request type: carrying mid-call PSTN signaling messages between PSTN gateways; carrying DTMF digits generated during a SIP session; carrying wireless signal strength information in support of wireless mobility applications; carrying account balance information; carrying images or other non streaming information between the participants of a session.

SIP defines two types of responses: provisional and final. Final responses convey the result of the request processing, and are sent reliably (e.g., always sent). Provisional responses provide information on the progress of the request processing, but are not sent reliably (e.g., not always sent). The receipt of a final 2xx response may be acknowledged by sending an ACK request. Similarly the receipt of a provisional response may acknowledged by sending a PRACK (which stands for provisional acknowledgment). PRACK is similar to any non-INVITE request occurring within a dialog and hence needs to have the correct Call-ID for the session in which it exists.

UPDATE may allow a user agent to update parameters of a session without impacting the state of the dialog. An UPDATE request may be sent before the initial INVITE has been completed and hence can be used to update session parameters within early dialogs. This method is similar to re-INVITE. It is useful, however, in scenarios where the state of the dialog may be preserved. Consider the following scenario of early media, a condition where the session is established, for the purpose of conveying progress of the call, but before the INVITE itself is accepted. Either caller or callee may be able to modify the characteristics of that session (putting the early media on hold, for example), before the call is answered. However, a re-INVITE may not be used for this purpose because the re-INVITE has an impact on the state of the dialog in addition to the session. As a result, the UPDATE request may allows the caller or callee to provide updated session information before a final response to the initial INVITE request. The UPDATE request may be sent by a user agent within a dialog to update session parameters without having an impact on the dialog state itself. Since the UPDATE request may be sent during phase one or two of a dialog, the UPDATE header may include a dialog ID associated with the first or second phase of the dialog (e.g., with or without a To tag).

The REFER method indicates that the recipient (identified by the Request-URI) may contact a third party using the contact information provided in the request. REFER may occur within or outside the scope of an existing dialog. A REFER may be followed by a NOTIFY to inform the user agent sending REFER of the status of the reference. In case a REFER occurs within a dialog, it may contain the correct Call-ID for that dialog.

The SIP protocol defines the REGISTER request using which user agents can register with a registrar, which is akin to registration of cell phones. This request occurs outside of existing requests and cannot establish a dialog on its own. The proxy issues a 200 OK upon successful registration of a user agent. Each unique REGISTER request may include its own Call-ID.

Figure 5A:
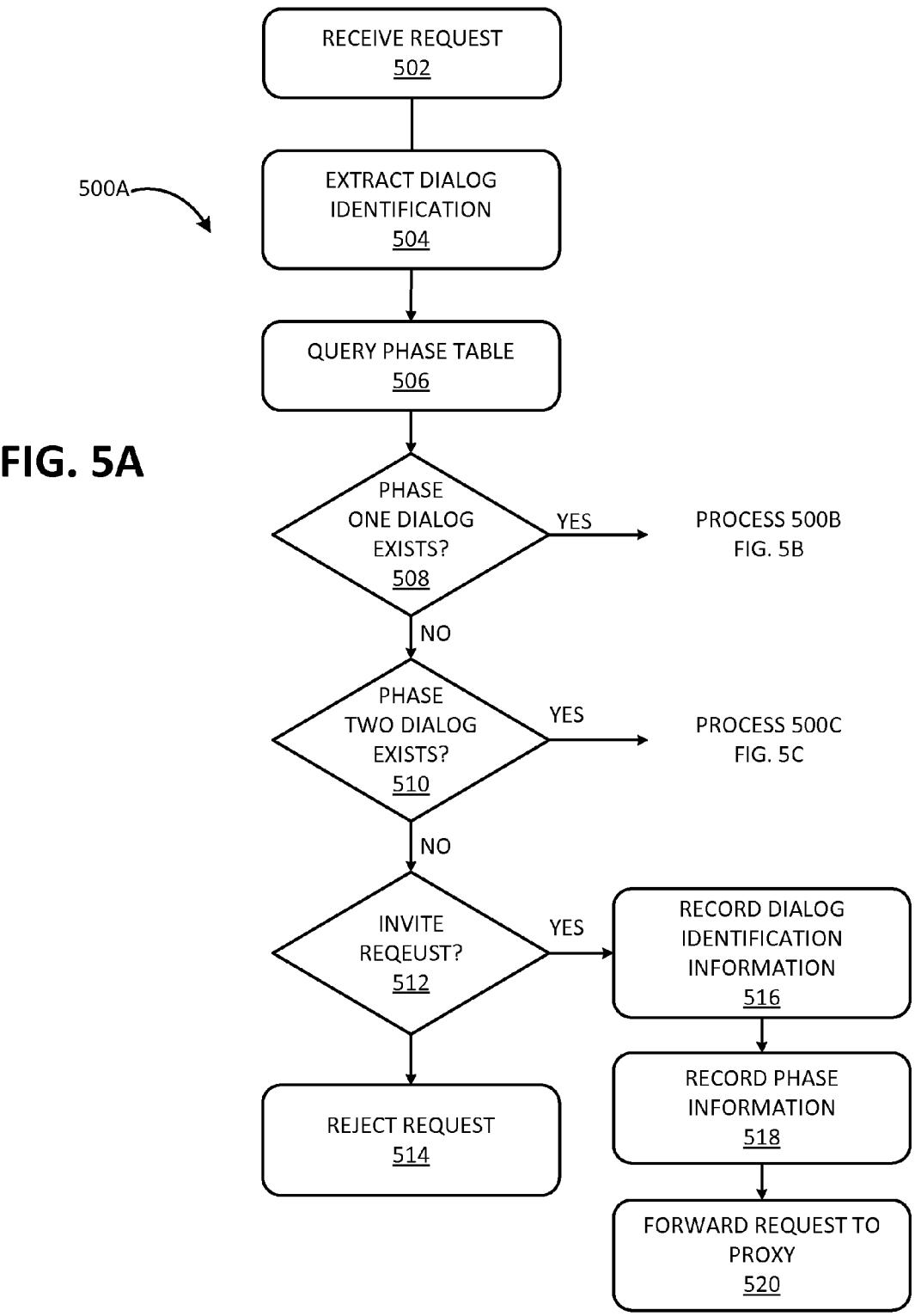
FIG. 5A is a flowchart of an exemplary process for dialog-level filtering.
Figure 5B:
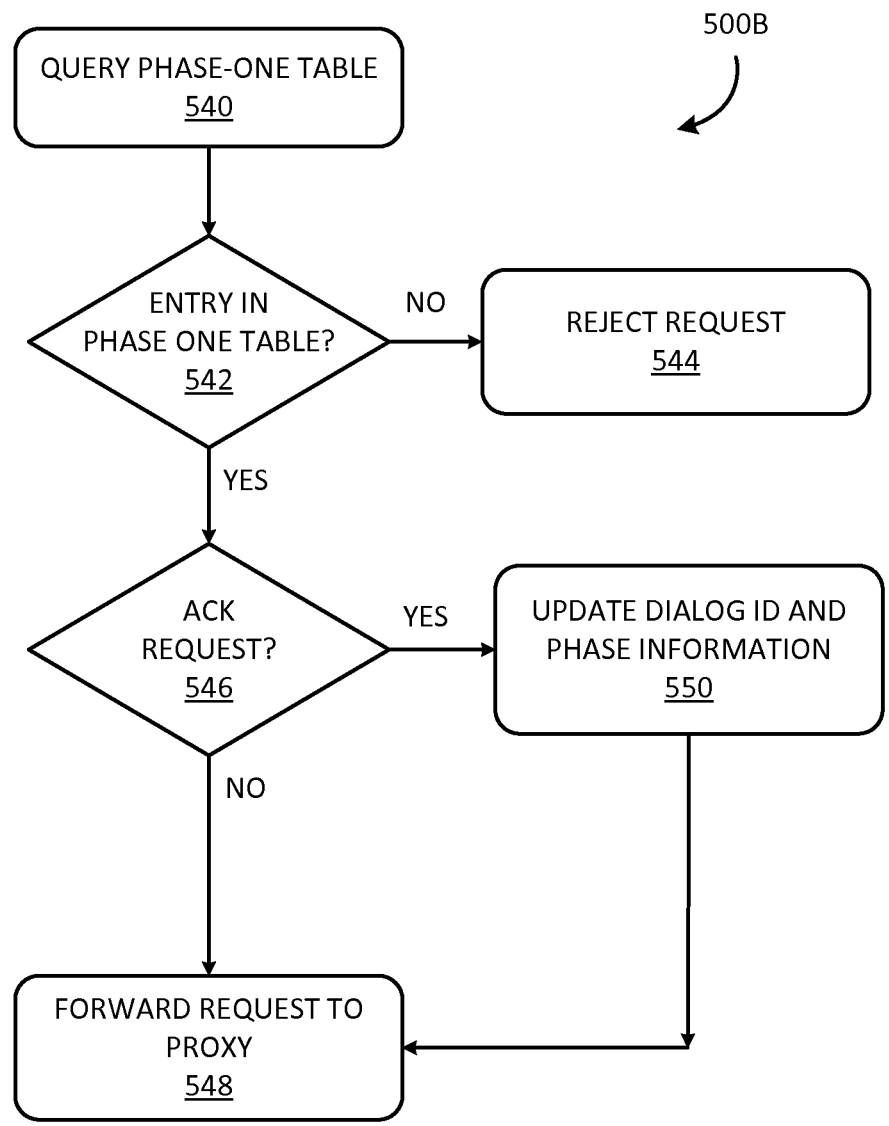
FIGS. 5B and 5C are flowcharts of an exemplary process for filtering out-of-phase request messages.
Figure 5C:
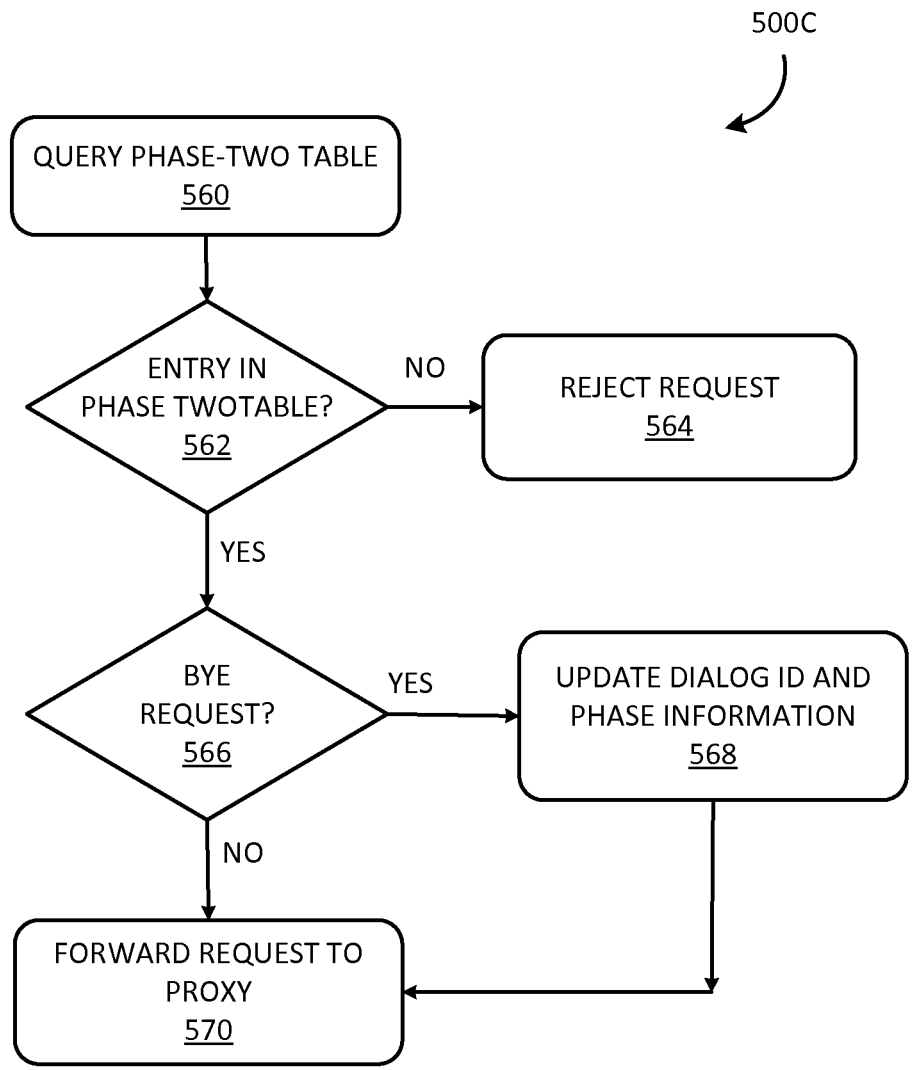

FIGS. 5A through 5C are flowcharts for processes 500A-500C for receiving request messages in network 100. NPD 104 (e.g., network processing logic 318) may execute process 500A-500C when a request message is received. FIG. 5A is a flowchart of an exemplary process 500A for receiving requests messages and applying a dialog-level filter. Process 500A may begin when NPD 104 receives a request message (block 502). The dialog ID may be extracted from the request message (block 504). The dialog ID may include the Call-ID, the From tag, and/or the To tag. In another embodiment, the dialog ID may include the Call-ID, the caller IP address, and the called IP address. As discussed above, different information may be used to identify (e.g., uniquely) a dialog.

The dialog table may be queried with the dialog ID (block 506) to determine whether the dialog, if it exists in the table at all, is in its first phase or second phase. Querying dialog table 412 may include, for example, hashing the information that identifies the dialog if dialog table 412 (e.g., CAM 312) is indexed by the hash of the information identifying the dialog. If the request does not correspond to a phase-one or phase-two dialog (block 508: NO; block 510: NO) (e.g., no such dialog exists), and the request is not an INVITE request (block 512: NO), then the request may be rejected (block 514). Thus, a request that is not part of an ongoing dialog and is not requesting to start a new dialog may be rejected. In this case, the request may form part of a DoS attack. In one embodiment, requests other than an INVITE request (e.g., an OPTIONS request) may start a dialog and may provide an exception at block 512. In one embodiment, such method requests are rejected if they do not occur inside a dialog initiated by an INVITE request.

Figure 6A:
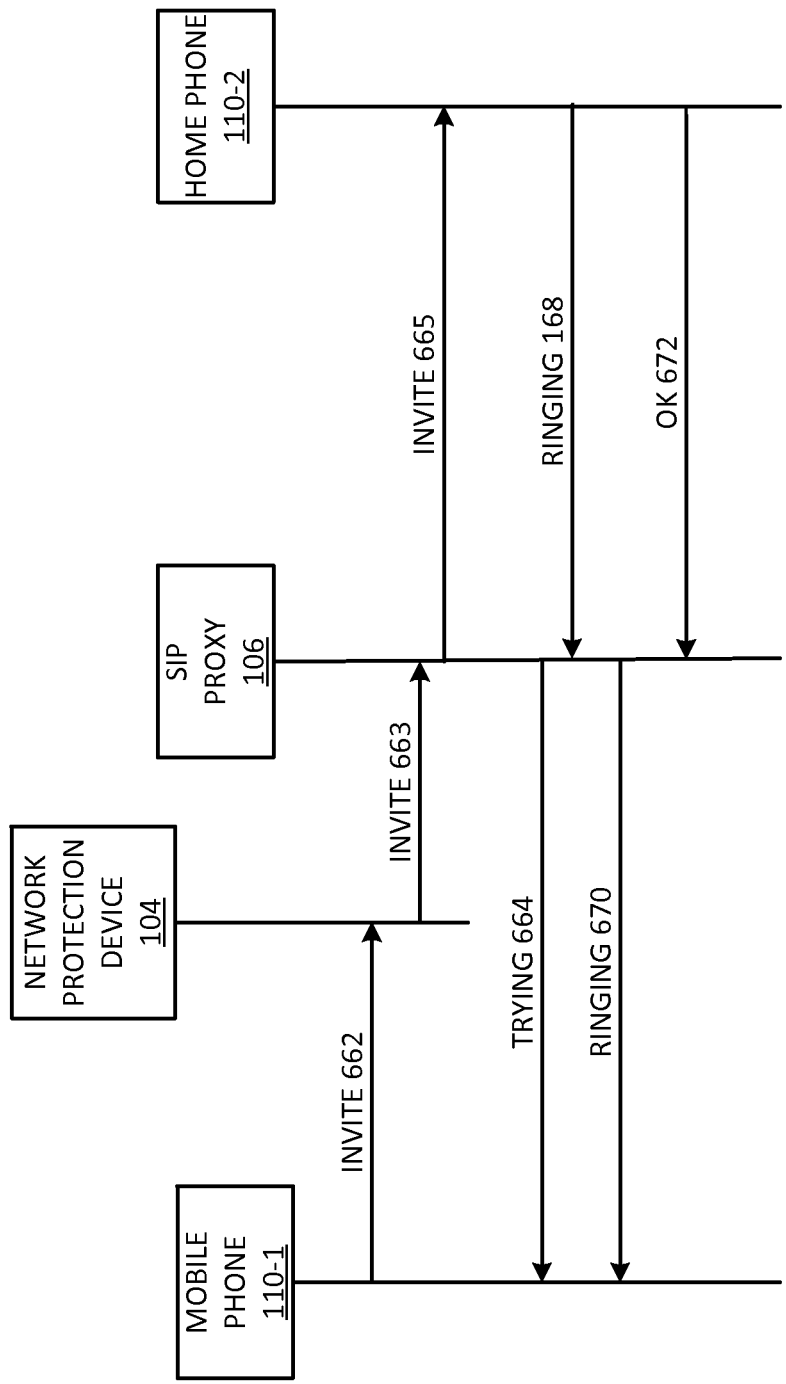
FIGS. 6A and 6B are block diagrams of messages sent in the network of FIG. 1D.

If, on the other hand, the request does not correspond to a phase-one or a phase-two dialog (block 508: NO; block 510: NO), but the request is an INVITE request, then a new dialog may be established. In this case, the dialog ID may be recorded (block 516) and the phase information may be recorded (block 518). For example, assume that mobile phone 110-1 wishes to place a call to home phone 110-2. In this case, as shown in FIG. 6A, mobile phone 110-1 sends an INVITE message 662 to home phone 110-2, which is intercepted by NPD 104. INVITE message 662 has header 310 as shown in FIG. 3B. The dialog ID information in this example includes a84b4c76e66710 @pc33.atlanta.com (e.g., the Call-ID) and tag=1928301774 (e.g., the From tag). The dialog ID information does not include a To tag because home phone 110-2 has not yet received an INVITE message for the dialog and has not yet assigned the To tag. In this example, dialog table 412 does not include any entry that would correspond to the received INVITE message 662, as it is the first message in the dialog. In this case, entry 432-2 may be added as shown in dialog table 412' of FIG. 4B (with the Call-ID and From tag of header 310). Further, the phase is indicated in phase field 420 as "1" for the first phase. Recording phase information (block 516) may include updating phase-one table 452 shown in FIG. 4C. For example, phase-one table 452 indicates that a CANCEL request, a PRACK request, an UPDATE request, and an ACK request are all valid requests that may be received during phase one for the corresponding dialog (defined in entries 460 of phase-one table 452). As shown in FIG. 6A, INVITE request message 662 is forwarded to proxy 106 as INVITE request message 663, which forwards INVITE request message 665 to home phone 110-2.

On the other hand, if a phase-one dialog already exists (block 508: YES), then network processing logic 318 may execute process 500B. Process 500B begins with querying phase-one table (block 540). A query to phase-one table may include the dialog-ID (e.g., extracted at block 504) and the name of the method request (e.g., INVITE, etc.). Querying phase-one table 452 may include, for example, hashing the information that identifies the dialog if phase-one table 452 (e.g., CAM 312) is indexed by the hash of the information identifying the dialog.

If an entry does not exist in phase-one table 452 for the corresponding request (block 542: NO), then the request may be rejected. If an entry does exist in phase-one table 452 for the corresponding request (block 542: YES), then the request may be forwarded to proxy 106 (block 548). In addition, if the request happens to be an ACK request message (block 546: YES), then the dialog table 412 may be updated to indicate that the phase has transitioned from phase one to phase two.

Figure 6B:
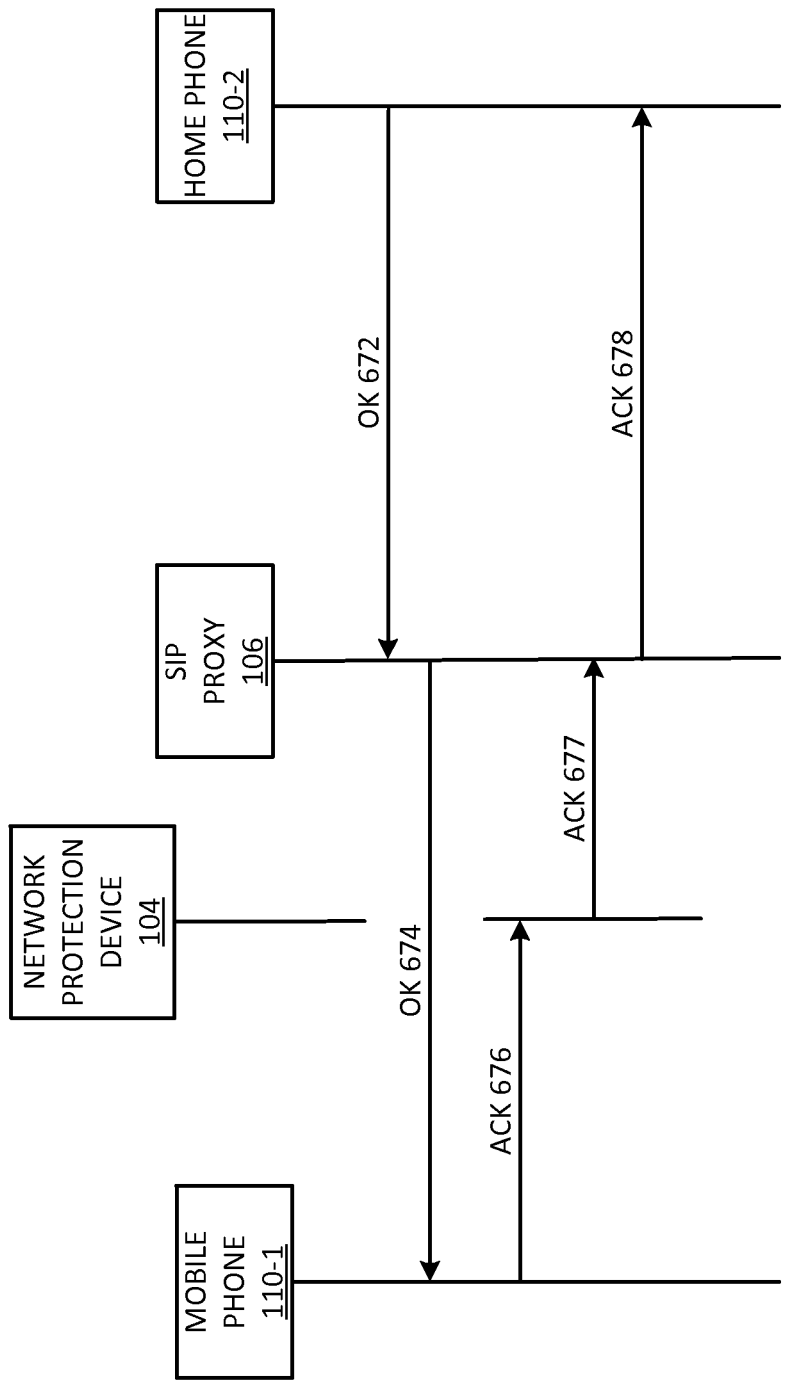

For example, as shown in FIG. 6B, mobile phone 110-1 may send ACK request message 676 to home phone 110-2, which is intercepted by NPD 104. ACK message 676 includes the Call-ID and the From tag identified in the original INVITE request message 662. ACK message 676 also includes the To tag (e.g., a6c85cf) that was part of on OK message 672 (e.g., with the header 312 shown in FIG. 3C). By querying dialog table 412', network processing logic 318 determines that a phase-one dialog exists (block 508: YES) and finds an entry in phase-one table 452 (e.g., entry 460-4) (block 542: YES). Thus, after extracting the dialog ID information, network processing logic 318 updates (block 550) the To tag information to the entry in dialog table 412' so that it appears as shown in entry 432-3 in dialog table 412" (e.g., including To tag of a6c85cf in To tag field 418). The indication of the phase in phase field 420 is also updated to "2" rather than "1." In this example, updating phase information (block 550) may also include updating phase-two table 454 shown in FIG. 4D. For example, phase-two table 454 indicates that an INVITE request, an OPTIONS request, an INFO request, a REFER request, a NOTIFY request, an UPDATE request, a CANCEL request, a PRACK request, an ACK request, and a BYE request are all valid requests for phase two of the dialog. In one embodiment, recording phase information may include removing the phase information for the corresponding dialog in phase-one table 452.

As another example, if a phase-one dialog exists (block 508: YES) and the request message is an INVITE message, then the INVITE message may be rejected (block 544) because there is no entry in phase-one table 452 for an INVITE message (block 542: NO). In this case, the INVITE message received (block 502) is a re-INVITE request that is out-of-phase. For example, if an INVITE message received that includes the header of FIG. 3B, then the extracted dialog identification information already exists in dialog table 412 (block 508: YES). In this case, the received INVITE request may be part of a DoS attack and the INVITE request is rejected (block 544). Blocking may include dropping the request, not storing the request, and/or not forwarding the request to proxy 106. In one embodiment, blocked requests are stored for further analysis, but not forwarded to proxy 106.

If a phase-two dialog exists (block 510: YES; block 508: NO), then network processing logic 318 may execute process 500C. Process 500C begins with a query of phase-two table (block 560). Querying phase-two table 454 may include, for example, hashing the information that identifies the dialog if phase-two table 454 (e.g., CAM 312) is indexed by the hash of the information identifying the dialog. If an entry does exist in phase-two table 454 (block 562: YES), then the request may be forwarded to proxy 106 (block 570). If an entry does not exist in phase-two table 454 (block 562: NO), then the request may be rejected (block 564). Rejection of a request may include dropping the packet and/or not forwarding the packet to proxy 106. In one embodiment, the packet may be saved for further analysis by, for example, the network administrator.

If the request is a BYE request message (block 566: YES), then the dialog ID and phase information may be updated (block 568). Updating the corresponding dialog ID information may include removing the dialog ID entry from phase table 412 and removing the corresponding dialog ID information from phase-one table 452 and phase-two table 454.

The foregoing description provides illustration and description, but is not intended to be exhaustive or to limit the embodiments to the precise form disclosed. Modifications and variations are possible in light of the above teachings or may be acquired from practice of the invention. For example, while series of acts have been described with regard to the flowcharts of FIGS. 5A-5C, the order of the acts may differ in other implementations. Further, non-dependent acts may be performed in parallel.

Although embodiments described herein in the context of SIP and an Internet Protocol (IP)-based network, in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP standard are examples of protocols that may be used for establishing a communications session among terminals, such as clients 110, connected to a network. Further, a combination of such protocols may be applied in various parts of the overall system.

Rejecting a packet, request, or message includes dropping the packet, request, or message and/or not forwarding the packet, request, or message to a proxy. Rejecting a packet, request, or message may include storing the packet, request, or message for further analysis, for example. Accepting or allowing a packet, request, or message may include forwarding the packet, request, or message to a proxy.

Embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving a session initiation protocol (SIP) request message;
   determining whether a dialog exists corresponding to the request message;
   determining whether the dialog is in a first phase of the dialog or a second phase of the dialog when the dialog exists corresponding to the request message;
   querying a table indicating valid types of requests for the first phase of the dialog, when determined that the dialog is in the first phase, to determine whether the received request message is one of the valid types of requests for the first phase or querying a table indicating valid types of requests for the second phase of the dialog, when determined that the dialog is in the second phase, to determine whether the received request message is one of the valid types of requests for the second phase; and
   rejecting the received request message when determined that the request message is not one of the valid types of requests for the first phase when determined that the dialog is in the first phase, or not one of the valid types of requests for the second phase when determined that the dialog is in the second phase.

2. The method of claim 1, wherein the first phase includes a time period before receipt of an ACK request in the dialog and the first phase does not include a time period after receipt of the ACK request.

3. The method of claim 2, wherein determining whether the dialog is in the first phase or the second phase comprises determining that the dialog is in the first phase, wherein querying includes querying the table indicating valid types of requests for the first phase, and wherein the table indicating valid types of requests for the first phase indicates that a CANCEL request, a PRACK request, and an UPDATE request are valid types of requests and that an INVITE request is not a valid type of request.

4. The method of claim 1, further comprising:
   determining that the received request message is one of the valid types of requests for the first phase based on the querying of the table;
   forwarding the request message to a proxy when determined that the received request message is one of the valid types of requests for the first phase; and
   rate limiting forwarding request messages determined to be valid types of requests for the first phase to the proxy.

5. The method of claim 4, wherein the table indicating valid types of requests for the first phase include a content-addressable memory (CAM), and wherein the CAM is addressable based on a Call-ID associated with the first phase of the dialog.

6. The method of claim 5, wherein the CAM is addressable based on a From tag associated with the first phase of the dialog.

7. The method of claim 1, wherein the second phase includes a time period after receipt of an ACK request message in the dialog and the second phase does not include a time period before receipt of the ACK request message.

8. The method of claim 7, wherein the table indicating valid types of requests includes a content-addressable memory (CAM), and wherein the CAM is addressable based on a Call-ID associated with the second phase of the dialog.

9. The method of claim 8, further comprising:
   forwarding the request message to a proxy when determined that the received request message is one of the valid types of requests; and
   rate limiting forwarding request messages determined to be valid types of requests for the second phase to the proxy.

10. The method of claim 8, wherein the CAM is addressable based on a From tag associated with the first phase of the dialog.

11. The method of claim 10, wherein the CAM is addressable based on a To tag associated with the first phase of the dialog.

12. A network device comprising:
    a receiver to receive a session initiation protocol (SIP) request message;
    a memory to store
      a dialog table of dialog identifiers (IDs) of current dialogs between user agents, wherein the memory stores an indication of whether each corresponding dialog is in a first phase or a second phase,
      a first valid type table to identify valid types of SIP requests associated with the first phase of the current dialogs and a second valid type table to identify valid types of SIP requests associated with the second phase of the current dialogs; and
    a processor to determine whether a dialog exists corresponding to the received SIP request message based on the dialog table, determine whether the dialog is in the first phase or the second phase when determined that the dialog exists corresponding to the received SIP request message, determine whether the received SIP request message is a valid type of SIP request based on the first valid type table when determined that the dialog is in the first phase or based on the second valid type table when determined that the dialog is in the second phase, and reject the received SIP request message when the SIP received request message is determined not to be a valid type of SIP request.

13. The network device of claim 12, wherein the first phase includes a time period before receipt of an ACK request message in the corresponding dialog and not a time period after receipt of the ACK request message.

14. The network device of claim 13, wherein the processor determines that the dialog is in the first phase and the first valid type table indicates that a CANCEL request, a PRACK request, and an UPDATE request are valid requests and that an INVITE request is not a valid request.

15. The network device of claim 14, wherein the memory includes a content-addressable memory (CAM), wherein the CAM is addressable based on a Call-ID associated with the first phase of the dialog.

16. The network device of claim 15, wherein the CAM is addressable based on a From tag associated with the first phase of the dialog.

17. The network device of claim 12, further comprising a transmitter to forward the received SIP request message to a proxy when the processor determines that the received SIP request message is a valid type of SIP request, wherein the processor rate limits forwarding SIP request messages determined to be a valid types of SIP requests to the proxy.

18. The network device of claim 12, wherein the second phase includes a time period after receipt of an ACK request in the corresponding dialog and does not include a time period before receipt of the ACK request.

19. The network device of claim 18, wherein the memory includes a content-addressable memory (CAM), and wherein the CAM is addressable based on a Call-ID associated with the second phase of the dialog.

20. The network device of claim 19, further comprising a transmitter to forward the received SIP request message to a proxy, wherein the processor is configured to rate limit forwarding SIP request messages determined to be valid types of SIP requests to the proxy.

21. The network device of claim 19, wherein the CAM is addressable based on a From tag associated with the first phase of the dialog.

22. The network device of claim 19, wherein the CAM is addressable based on a To tag associated with the first phase of the dialog.

23. A system comprising:
a session initiation protocol (SIP) proxy;
a network protection device comprising:
a receiver to receive SIP request messages;
a memory to store a dialog table of dialog identifiers (IDs) of current dialogs between user agents and an indication of whether each corresponding dialog is in an early phase, and to store a valid type table to identify valid types of SIP requests associated with the early phase of each corresponding dialog; and
a processor to
determine whether a dialog exists corresponding to each of the received SIP request messages based on the dialog table,
determine whether each dialog determined to exist is in an early phase,
determine whether each of the received SIP request messages corresponding to a dialog determined to exist includes a valid type of SIP request based on the valid type table, and
reject each of the received SIP request messages that is determined not to include a valid type of SIP request; and
a transmitter to forward each of the SIP request messages that is determined to include a valid type of SIP request to the proxy.

* * * * *